United States Patent [19]

Brown et al.

[11] 4,449,591
[45] May 22, 1984

[54] AGRICULTURAL CLEAN-OUT DRAG

[75] Inventors: George L. Brown, Idalou, Tex.; Lindell E. Lee, Jr., P.O. Box 402, Idalou, Tex. 79329

[73] Assignee: Lindell E. Lee, Jr., Idalou, Tex.

[21] Appl. No.: 329,293

[22] Filed: Dec. 10, 1981

[51] Int. Cl.³ .................. A01B 13/00; E02F 5/02
[52] U.S. Cl. ................ 172/195; 172/705; 172/721
[58] Field of Search ............ 172/197, 142, 764, 771, 172/195, 705, 709, 712, 193, 195, 198, 176, 722, 721

[56] References Cited

U.S. PATENT DOCUMENTS

| | | | |
|---|---|---|---|
| 800,005 | 9/1905 | McEwing | 172/709 X |
| 1,054,659 | 2/1913 | Luke | 172/176 |
| 1,204,890 | 11/1916 | Logsdon | 172/722 |
| 1,326,538 | 12/1919 | Smith | 172/721 X |
| 1,401,029 | 12/1921 | Armantrout | 172/195 |
| 1,818,529 | 8/1931 | Bockwitz | 172/705 |
| 1,889,486 | 11/1932 | McGregor | 172/195 |
| 2,069,147 | 1/1937 | Hayes | 172/193 |
| 2,214,812 | 9/1940 | Drew | 172/200 |
| 2,424,820 | 7/1947 | Hall | 172/193 |
| 2,618,081 | 11/1952 | Sinner | 172/200 X |
| 2,673,511 | 3/1954 | Roberts | 172/722 |
| 2,829,578 | 4/1958 | Brown | 172/170 |
| 3,123,155 | 3/1964 | Okawaki | 172/722 |
| 3,124,202 | 3/1964 | Vandyk | 172/551 |
| 3,191,690 | 6/1965 | Hill | 172/722 |
| 3,991,831 | 11/1976 | Foster | 172/198 |
| 4,002,413 | 1/1977 | Foster | 403/234 |

*Primary Examiner*—Richard J. Johnson
*Attorney, Agent, or Firm*—Wendell Coffee

[57] ABSTRACT

An agricultural clean-out drag particularly adapted to smooth out dikes, is mounted upon a boom. The drag is pivoted rearward of center so the front of the drag tends to hang down to bear against the ground. The drag is a shell, semi-circular in shape. The front is flat. The boom is pivoted behind the plow shank and is spring biased downward. The front of the drag is chained to the boom to limit the downward travel of the front of the drag.

12 Claims, 5 Drawing Figures

U.S. Patent
May 22, 1984
4,449,591
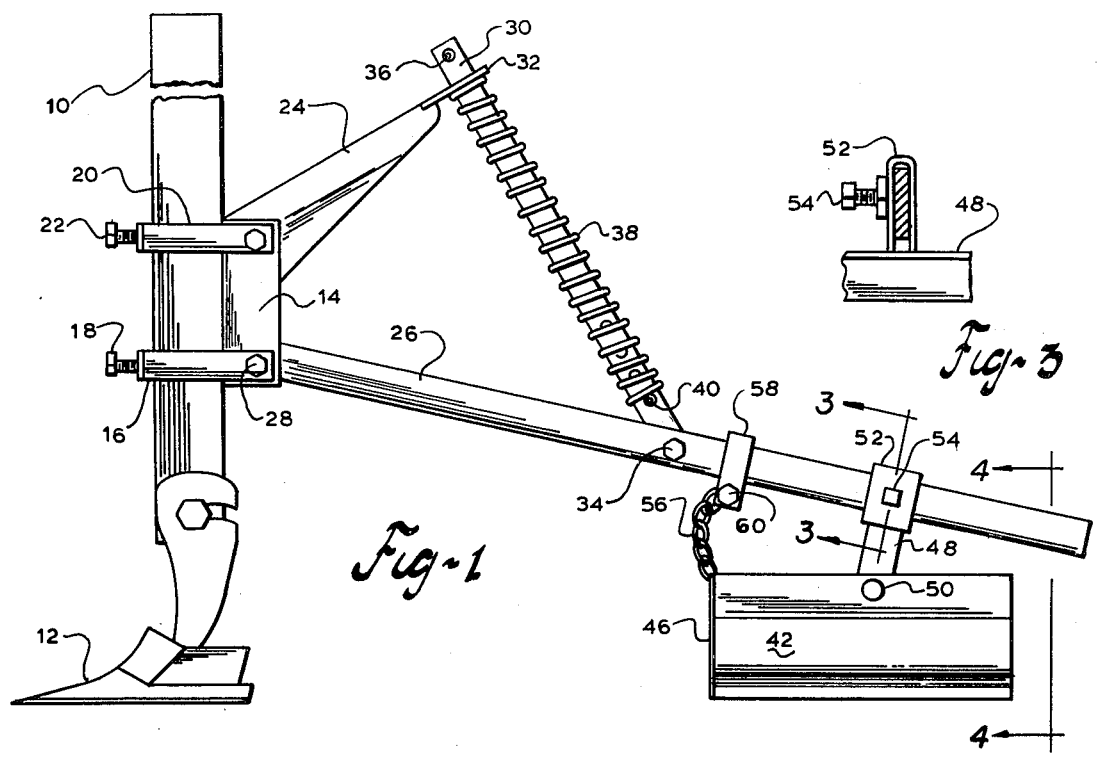
Fig-1
Fig-3
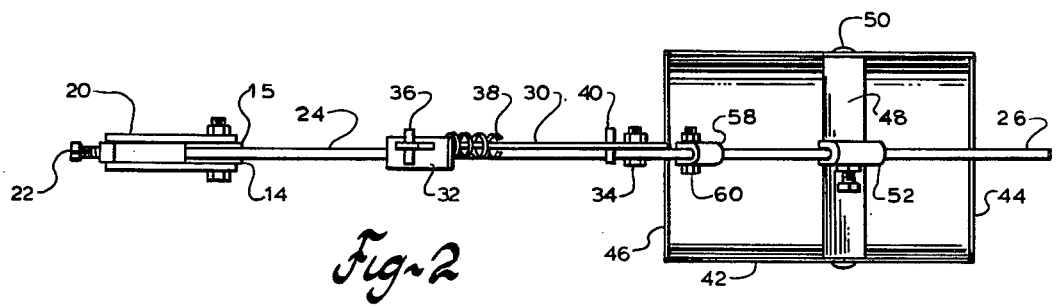
Fig-2
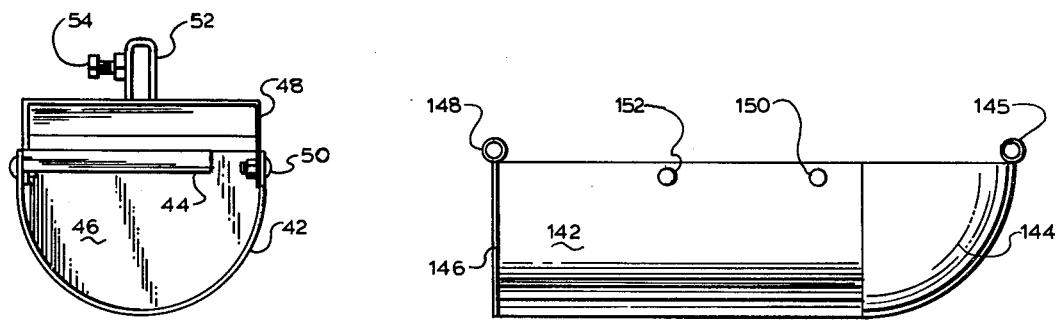
Fig-4
Fig-5

AGRICULTURAL CLEAN-OUT DRAG

BACKGROUND OF THE INVENTION

1. Field of the Invention

This invention relates to agricultural implements and more particularly to earth working implements to clean out the furrow for the purpose of irrigating the furrow or harvest the crop after the land has been cultivated.

2. Description of the Prior Art

In commercial farming operations at the time this invention was made, furrows were being cleaned by bullet drags. These drags were cylindrical with a bullet-shaped nose. A loop was attached to the nose and the bullet drag towed behind a cultivator by a chain. There were no provisions to lift the drag when the cultivator was lifted.

Before this application was filed, a search was made in the U.S. Patent and Trademark Office. The search revealed the following five patents:
LUKE, ET AL 1,054,659,
BROWN 2,829,578,
VAN DYK 3,124,202,
FOSTER 3,991,831,
FOSTER 4,002,413.

The applicant considers these patents pertinent because the searcher reported these patents upon the search. Except for this, the applicant does not believe the patents are pertinent to his invention.

SUMMARY OF THE INVENTION

1. New and Different Function

This invention provides a clean-out drag which is mounted upon the cultivator shank, so that when the cultivator is raised from the ground, the clean-out drag will also be raised from the ground. This is particularly useful, inasmuch as often in irrigation, it is desired to dam the end of the rows. Therefore, by lifting the drag together with the cultivator sweep, the dam at the end of the row is not destroyed by the drag. Also, many times it is desirable to back the tractor with a cultivator with the drags attached thereon. With the previous bullet drags, this was difficult if not impossible.

Also with the spring adjustments, it is possible to adjust the amount of cleaning out that is done by the drag. Also, in addition to adjusting the spring pressure, the amount the front "digs in" can be adjusted by the chain at the front of the drag.

Further, much land is diked (i.e. has the furrow filled every 10 to 20 feet). A flat forward face is very useful to smooth out the dikes before harvesting the crop.

Thus it may be seen that the function of the total combination far exceeds the combination of functions of the individual elements such as pivots, booms, springs, shells, etc.

2. Objects of this Invention

An object of this invention is to clean out and smooth a furrow.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a side elevational view of a plow shank and plow with the improved drag.

FIG. 2 is a top elevational view of the improved drag.

FIG. 3 is a sectional view thereof, taken substantially on line 3—3 of FIG. 1.

FIG. 4 is a back elevational view of the shell and bail taken substantially on line 4—4 of FIG. 1.

FIG. 5 is a side elevational view of a modified drag according to this invention.

DESCRIPTION OF THE PREFERRED EMBODIMENT

Referring to the drawings, there may be seen plow shank 10 adapted to be attached to the tool bar of a tractor to be drafted through a field. The plow shank has a plow in the form of conventional sweep 12 attached to the bottom thereof.

Anchor plate 14 has bottom shank loop 16 which surrounds the shank 10. Set screw 18 in the bottom shank loop 16 fixes the anchor plate 14 in a fixed position upon the shank 10. Top shank loop 20 is attached to the anchor plate 14 and surrounds the shank. Set screw 22 through the top shank loop 20 bears against the shank 10 and holds it in position. Gaff 24 is rigidly attached to the anchor plate 14. The gaff 24 extends rearwardly and upward from the anchor plate 14.

Boom 26 is pivoted by bolt 28 to the bottom of the anchor plate 14. The boom 26 extends generally rearwardly of the anchor plate 14. As a matter of construction, the anchor plate is actually in two parts having a plate 14 and a plate 15 with the gaff 24 and the boom 26 mounted between the two individual plates 14 and 15. It may be seen that the anchor plate with the anchor loop 16 and 20 form a clamp by which the boom 26 is adapted to be clamped to the plow shank 10.

Rod 30 slides through slide plate 32 on the distal end of the gaff 24. The bottom of rod 30 is pivoted by bolt 34 to the boom 26. Roll pin 36 extends through the top of the rod 30 thereby the downward movement of the boom 26 is limited. Helical compression spring 38 surrounds the rod 30. The top of helical compression spring 38 bears against the bottom of the gaff 24 inasmuch as it bears against the bottom of the slide plate 32, a part of the gaff 24. The bottom of helical compression spring 38 bears against roll pin 40, which extends through one of a plurality of holes in the rod 30. Therefore, the helical compression spring 38 biases the boom 26 downward.

The earth moving element of the drag has an arcuate cross-section. It is in the form of a semi-cylindrical shell 42, for example a section of pipe cut lengthwise. The shell 42 is open at the top and the back. Strap 44 extends across the top back of the shell 42 to reinforce and stiffen the shell 42 at this point. The front of the shell 42 is closed by flat semi-circular plate 46.

Bail 48 is a rear hanger or a structural member pivoted to the shell 42 rearwardly of the center of the shell. As may be seen, particularly in FIG. 1 and FIG. 2, the bolts 50 by which the bail 48 is pivoted to the shell 42 is closer to the back strap 44 than it is to the front plate 46.

Bail loop 52 is attached to the bail 48 and slides upon the boom 26. Set screw 54 extends through the loop 52 to hold the slide in adjusted position upon the boom 26.

A flexible tension or structural element or front support in the form of chain 56 is attached to the front of the shell 42, i.e. it is attached to the flat semi-circular plate 46. The chain 56 extends upward to slide 58 which is on the boom 26. The slide 58 is clamped into adjustable position by the bolt 60.

FIG. 5 is a shows a modified form of the invention.

The form showed in FIG. 5 is a drag which is adapted to be reversed end for end. One end of the drag has a flat plate 146. The flat plate is particularly adapted to smooth out dikes. I.e. when the rows have dams or dikes of earth in the furrows, the flat plate will tend to smooth them out. The other end has a prow or bullet shape to it so that it has a tendency to pull easier and ride over obstructions rather than knock them out. As stated above, the traditional shape of the drag is to have this bullet-shape. By having two holes (hole 150 and second hole 152) the bail, such as bail 48 may be attached either to one of the holes to operate it in either direction. I.e., if it is desired to use the flat plate as the forward end, the bail can be attached to the hole 150 and the strctural member (in the form of a chain) attached to loop 148 at the flat plate, which would then be the forward end. Alternatively, if it is desired to operate it with a bullet-shaped nose, then the bail is attached to the hole 152 and the structural member or chain is attached to the loop 145, which is attached to the top of the bullet-shaped area.

Those with ordinary skill in the art will understand that rather than having the two ends of different shape, that both the ends could be the same shape, and the drag could be reversible merely to even wear, to extend the life of the drag by having different wear areas. I.e. if the forward end of the drag wears more, then when it is thin, from abrasion with the ground, that it can be reversed so that the other end is then the forward end.

Thus it may be seen that we have provided a simple, effective, clean-out tool, which may be readily lifted from the furrow when the plow 12 is lifted by the plow shank 10.

The embodiments shown and described above are only exemplary. We do not claim to have invented all the parts, elements or steps described. Various modifications can be made in the construction, material, arrangement, and operation, and still be within the scope of our invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| | | | |
|---|---|---|---|
| 10 | plow shank | 36 | roll pin |
| 12 | sweep | 38 | spring |
| 14 | anchor plate | 40 | roll pin |
| 15 | plate | 42 | shell |
| 16 | bottom loop | 44 | strap |
| 18 | set screw | 46 | plate |
| 20 | top loop | 48 | bail |
| 22 | set screw | 50 | bolts |
| 24 | gaff | 52 | bail loop |
| 26 | boom | 54 | set screw |
| 28 | bolt | 56 | chain |
| 30 | rod | 58 | slide |
| 32 | slide plate | 60 | bolt |

-continued

| | |
|---|---|
| 34 | bolt |

SUBJECT MATTER CLAIMED FOR PROTECTION

We claim as our invention:

1. A drag for cleaning out agricultural furrows behind plows comprising:
   a. a semi-cylinder shell open at the back and top,
   b. a flat semi-circular plate attached to the front of the shell closing it,
   c. a bail pivoted to the shell rearward of the center of the shell,
   d. a boom adapted to be attached to a plow shank,
   e. said bail attached to the boom, and
   f. a flexible tension element extending from the boom to the flat plate at the front of the shell.

2. The invention as defined in claim 1 further comprising:
   g. a clamp adapted to be attached to a plow shank,
   h. the boom pivoted to the bottom of the clamp whereby the boom is adapted to be attached to the shank as defined above,
   i. a gaff at the top of the clamp, and
   j. spring means extending from the gaff to the boom for biasing the boom down.

3. The invention as defined in claim 2 wherein said spring means includes:
   k. a rod limiting the downward travel of the boom, and
   l. a helical compression spring around the rod.

4. The invention as defined in claim 1 further comprising:
   g. a loop on the bail,
   h. said loop around the boom, and
   i. a set screw through the loop bearing against the boom thereby adjustably attaching the bail to the boom as defined above.

5. The invention as defined in claim 1 further comprising:
   g. a slide on the boom, and
   h. said flexible tension element is in the form of a chain attached to said slide whereby the chain extends from the flat plate to the boom as defined above.

6. The invention as defined in claim 1 further comprising:
   g. an anchor plate,
   h. the boom pivoted to the bottom of the anchor plate,
   i. a gaff at the top of the anchor plate,
   j. a loop at the top of the anchor plate adapted to surround a plow shank,
   k. a loop at the bottom of the anchor plate adapted to surround a plow shank,
   l. a set screw in each loop whereby the anchor plate may be attached to a plow shank, whereby
   m. the boom is adapted to be attached to the plow shank as defined above,
   n. a rod slidingly connected to the gaff and pivotly connected to the boom, and
   o. a helical compression spring surrounding the rod,
   p. said helical compression spring bearing against the gaff at the top and a pin extending through the rod at the bottom of the helical compression spring so that q. the boom is biased downwardly by the spring, but the downward travel of the boom is limited by the rod.

7. The invention as defined in claim 6 further comprising:
   r. a slide on the boom, and
   s. said flexible tension element is in the form of a chain attached to said slide whereby the chain extends from the flat plate to the boom as defined above.

8. The invention as defined in claim 7 further comprising:
   t. a loop on the bail,
   u. said loop around the boom, and
   v. a set screw through the loop bearing against the boom thereby adjustably attaching the bail to the boom as defined above.

9. An agricultural implement comprising:
   a. a plow shank,
   b. a plow in the form of a sweep on the bottom of the plow shank,
   c. an anchor plate,
   d. a loop on the bottom of the anchor plate surrounding the plow shank,
   e. a loop in the top of the anchor plate surrounding the plow shank,
   f. a set screw in each of the loops bearing against the plow shank so that the anchor plate is adjustably attached to the plow shank,
   g. a boom pivoted to the bottom of the anchor plate,
   h. a gaff attached to the top of the anchor plate,
   i. a rod slidably connected to the gaff,
   j. said rod pivotly connected to the boom,
   k. a helical compression spring surrounding the rod,
   l. said compression spring bearing against the gaff at the top,
   m. said compression spring bearing against a pin extending through the rod at the bottom,
   n. whereby the boom is biased downward by the compression spring, but the travel of the boom is limited by the rod,
   o. a slide on the boom,
   p. a chain attached to the slide,
   q. a bail having a loop thereon,
   r. the loop telescoped on the boom,
   s. a set screw through the loop on the bail to hold the loop in position on the boom,
   t. a semi-cylinder shell open at the back and top,
   u. a flat semi-circular plate attached to the front of the shell closing it,
   v. said bail pivoted to the shell rearward of the center of the shell, and
   w. said chain attached to the front plate at the front of the shell.

10. The invention as defined in claim 9 further comprising:
    x. a strap extending from across the top of the open back of the shell.

11. A drag for cleaning out agricultural furrows behind plows comprising:
    a. a shell having a semi-circular cross-section,
    b. a flat, semi-circular plate attached to the front of the shell closing it,
    c. a rear hanger pivoted to the shell rearward of the center of the shell and including an upwardly extending connecting member,
    d. a rearwardly extending boom overlying said shell,
    dd. a boom clamp on the front of the boom adapted to be attached to a plow shank,
    e. said rear hanger connecting member connected to the boom, and
    f. a front support extending from the front of the shell to a midportion of the boom behind said boom clamp; and
    g. means for biasing said shell downwardly.

12. A drag for cleaning out agricultural furrows behind plows comprising:
    a. a shell having a semi-circular cross-section,
    b. a flat, semi-circular plate attached to the front of the shell closing it,
    c. a rear hanger pivoted by a pivot hole in the shell to the shell rearward of the center of the shell,
    d. a rearwardly extending boom,
    dd. a boom clamp on the front of the boom adapted to be attached to a plow shank,
    e. said rear hanger connected to a midportion of the boom,
    e. connecting means at the front and rear of the shell,
    f. a front support extending from the boom to the front connecting means of the shell, and
    g. said shell having a closure attached to the rear and
    h. said shell having two longitudinally spaced pivot holes, whereby the shell may be reversed end for end.

* * * * *